(12) United States Patent
Coos

(10) Patent No.: US 9,758,131 B2
(45) Date of Patent: Sep. 12, 2017

(54) WINDSCREEN WIPER DEVICE

(71) Applicant: FEDERAL-MOGUL S.A., Aubange (BE)

(72) Inventor: Eric Coos, Cheniere (FR)

(73) Assignee: Federal-Mogul S.A., Aubange (BE)

( * ) Notice: Subject to any disclaimer, the term of this patent is extended or adjusted under 35 U.S.C. 154(b) by 0 days.

(21) Appl. No.: 14/903,329

(22) PCT Filed: Jul. 9, 2013

(86) PCT No.: PCT/EP2013/064481
§ 371 (c)(1),
(2) Date: Jan. 7, 2016

(87) PCT Pub. No.: WO2015/003740
PCT Pub. Date: Jan. 15, 2015

(65) Prior Publication Data
US 2016/0144830 A1    May 26, 2016

(51) Int. Cl.
*B60S 1/40*    (2006.01)
*B60S 1/34*    (2006.01)
*B60S 1/38*    (2006.01)

(52) U.S. Cl.
CPC ........... *B60S 1/3858* (2013.01); *B60S 1/3429* (2013.01); *B60S 1/3497* (2013.01); *B60S 1/3868* (2013.01);
(Continued)

(58) Field of Classification Search
CPC .... B60S 1/3429; B60S 1/3497; B60S 1/3868; B60S 1/40; B60S 1/4064
(Continued)

(56) References Cited

U.S. PATENT DOCUMENTS 6,161,248 A * 12/2000 Merkel .................. B60S 1/38
15/250.32
2006/0248675 A1   11/2006 Vacher et al.
(Continued)

FOREIGN PATENT DOCUMENTS

DE    10 2011 077483 A1   12/2012
DE    10 2011 084471 A1    4/2013
(Continued)

*Primary Examiner* — Gary Graham
(74) *Attorney, Agent, or Firm* — Robert L. Stearns; Dickinson Wright, PLLC

(57) ABSTRACT

A windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which wiper blade comprises a connecting device for an oscillating arm, wherein the oscillating arm near one end thereof is pivotally connected to the wiper blade and near the other end thereof is connected to a mounting head on a drive shaft for transferring a reciprocal movement to the wiper blade, with the special feature that the connecting device comprises at least two opposing spaced-apart sidewalls each comprising a protrusion extending sidewardly and outwardly, wherein the connecting device and the oscillating arm are interconnected by the protrusions pivotally and snappingly engaging into correspondingly shaped recesses of the oscillating arm, wherein the oscillating arm comprises a downwardly extending guiding tongue engaging into a guiding groove of the connecting device defined between the sidewalls thereof, and wherein the connecting device has an asymmetric form with respect to its middle transverse plane, seen in vertical direction, in order to ensure that the wiper blade can only be mounted on
(Continued)

the oscillating arm in a predetermined orientation of the wiper blade relative to the oscillating arm.

5 Claims, 8 Drawing Sheets

(52) U.S. Cl.
CPC ........... *B60S 1/4064* (2013.01); *B60S 1/4077* (2013.01); *B60S 1/3434* (2013.01)

(58) Field of Classification Search
USPC .......................... 15/250.32, 250.43, 250.201
See application file for complete search history.

(56) References Cited

U.S. PATENT DOCUMENTS

2011/0107542 A1* 5/2011 Op't Roodt ........... B60S 1/3851
15/250.31
2012/0144616 A1* 6/2012 Kim ........................ B60S 1/387
15/250.32

FOREIGN PATENT DOCUMENTS

| EP | 2 236 366 A1 | 10/2010 |
| WO | WO2005/000647 A1 * | 1/2005 |
| WO | WO2010/112579 A1 * | 10/2010 |
| WO | WO 2013/097982 A1 | 7/2013 |

\* cited by examiner

WINDSCREEN WIPER DEVICE

BACKGROUND OF THE INVENTION

1. Technical Field

The present invention relates to a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which wiper blade comprises a connecting device for an oscillating arm, wherein the oscillating arm near one end thereof is pivotally connected to the wiper blade and near the other end thereof is connected to a mounting head on a drive shaft for transferring a reciprocal movement to the wiper blade.

The present invention also refers to a single wiper blade, as well as to a single connecting device arranged to be used in a windscreen wiper device in accordance with the present invention.

Free ends of the strip or "flexor" are preferably connected to a respective connecting piece or "end cap", wherein the wiper blade is preferably provided with a spoiler or cover at a side thereof facing away from the windscreen to be wiped.

It is noted that the present invention is not restricted to windscreen wiper devices for cars, but that it also relates to windscreen wiper devices for rail coaches and all of the (fast) vehicles.

2. Related Art

A windscreen wiper device of the flat blade type is generally known. The prior art windscreen wiper device is in particular indicated as a "flat blade" or "yokeless blade", wherein use is no longer made of several yokes pivotally connected to each other, but wherein the wiper blade is biased by the carrier element, as a result of which it exhibits a specific curvature. In practice the oscillating arm is connected to the mounting head fixed for rotation to the shaft driven by a small motor. In use, the shaft rotates alternately in a clockwise and in a counter-clockwise sense carrying the mounting head into rotation also, which in turn draws the oscillating arm into rotation and by means of the connecting device moves the wiper blade.

A disadvantage of the known windscreen wiper device is the following. In practice it has become apparent that, during replacement of a wiper blade of the known windscreen wiper device, the wiper blade may be mounted on the oscillating arm in a reversed manner. More in particular, when in mounted position the wiper blade over a first portion of its length is covered by the oscillating arm and over a second portion of its length is provided with a single cover in order to ensure that the wiper blade at least to a large extend is invisible from the outside, during replacement the wiper blade may be mounted in a reverse manner such that the cover interferes with the oscillating arm. Further for example in case of a wiper blade for a rear window of an automobile, the longitudinal strip may be asymmetric, so that such a reversed mounting of the wiper blade seriously affects the wiping qualities thereof, particularly at high speeds, with all negative consequences involved.

SUMMARY OF THE INVENTION

It is the object of the present invention to provide a windscreen wiper device of the "flat blade" type, wherein it is no longer possible to mount a wiper blade thereof in an adverse manner, particularly in case the wiper blade over a portion of its length is covered with a single cover in order to ensure that in mounted position the wiper blade at least to a large extend is invisible from the outside.

In order to accomplish that objective, a windscreen wiper device of the type referred to in the introduction is characterized according to the invention in that the connecting device comprises at least two opposing spaced-apart sidewalls each comprising a protrusion extending sidewardly and outwardly, wherein the connecting device and the oscillating arm are interconnected by the protrusions pivotally and snappingly engaging into correspondingly shaped recesses of the oscillating arm, wherein the oscillating arm comprises a downwardly extending guiding tongue engaging into a guiding groove of the connecting device defined between the sidewalls thereof, and wherein the connecting device has an asymmetric form with respect to its middle transverse plane, seen in vertical direction, in order to ensure that the wiper blade can only be mounted on the oscillating arm in a predetermined orientation of the wiper blade relative to the oscillating arm. Due to this asymmetric shape of the connecting device or connector, a so-called "poka yoke" construction is obtained, wherein during replacement a reverse mounting of the wiper blade onto the oscillating arm is made impossible. Particularly, the asymmetric shape does not allow the protrusions to pivotally and snappingly engage into the recesses of the oscillating arm in an attempt to adversely mount the wiper blade. In other words, the present invention prevents clipping the wiper blade onto the oscillating arm in a reverse manner during replacement.

The windscreen wiper device is particularly arranged to be mounted on a rear window of the automobile.

In a preferred embodiment of a windscreen wiper device in accordance with the invention the guiding groove of the connecting device comprises a transverse rib at a side of the connecting device facing towards the mounting head arranged for obtaining the asymmetric form of the connecting device. In an attempt to mount the wiper blade onto the oscillating arm in a reverse manner during replacement, the guiding tongue would be blocked by the transverse rib to slide inside the guiding groove, so that the protrusions are not allowed to pivotally engage into the recesses of the oscillating arm through a snapping operation. Hence, at that occasion the transverse rib functions as a stop surface for the guiding tongue of the oscillating arm. Preferably, the transverse rib is a transverse sidewall of the connecting device defining the guiding groove.

In another preferred embodiment of a windscreen wiper device according to the invention the connecting device comprises an extension at a side of the connecting device facing away from the mounting head arranged for obtaining the asymmetric form of the connecting device. Again, in an attempt to mount the wiper blade onto the oscillating arm in a reverse manner during replacement, the guiding tongue would be blocked by the extension to slide inside the guiding groove, so that the protrusions are not allowed to pivotally engage into the recesses of the oscillating arm through a snapping (or "clipping" operation). In other words, at that occasion the extension functions as a stop surface for the oscillating arm. Preferably, the extension is a thicker endwall of the connecting device facing away from the mounting head.

In another preferred embodiment of a windscreen wiper device in accordance with the invention the connecting device is located inside the oscillating arm at the location of their interconnection, the connecting device is thus invisible from the outside in mounted position thereof. Preferably, the oscillating arm has a ü-shaped cross-section, wherein the guiding tongue extends downwardly from a base of the U-shaped cross-section.

The invention also refers to an elongated wiper blade of a flexible material, which can be placed in abutment with a windscreen to be wiped, which wiper blade includes at least one longitudinal groove, in which groove a longitudinal strip of the carrier element is disposed, which wiper blade comprises a connecting device for an oscillating arm, characterized in that the connecting device comprises at least two opposing spaced-apart sidewalls each comprising a protrusion extending sidewardly and outwardly, wherein the connecting device can be connected to the oscillating arm by the protrusions pivotally and snappingly engaging into correspondingly shaped recesses of the oscillating arm, wherein the connecting device comprises a guiding groove defined between the sidewalls thereof and arranged for receiving a downwardly extending guiding tongue of the oscillating arm, and wherein the connecting device has an asymmetric form with respect to its middle transverse plane, seen in vertical direction, in order to ensure that the wiper blade can only be mounted on the oscillating arm in a predetermined orientation of the wiper blade relative to the oscillating arm.

The present invention is also related to a connecting device for a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which connecting device is arranged for interconnecting the wiper blade and an oscillating arm, characterized in that the connecting device comprises at least two opposing spaced-apart sidewalk each comprising a protrusion extending sidewardly and outwardly, wherein the connecting device can be connected to the oscillating arm y the protrusions pivotally and snappingly engaging into correspondingly shaped recesses of the oscillating arm, wherein the connecting device comprises a guiding groove defined between the sidewalls thereof and arranged for receiving a downwardly extending guiding tongue of the oscillating arm, and wherein the connecting device has an asymmetric form with respect to its middle transverse plane, seen in vertical direction, in order to ensure that the wiper blade can only be mounted on the oscillating arm in a predetermined orientation of the wiper blade relative to the oscillating arm. Preferably, the connecting device is made in one piece of plastic. In another preferred embodiment the connecting device is made of metal, such as steel or aluminum.

THE DRAWINGS

The invention will now be explained in more detail with reference to figures illustrated in a drawing, wherein.

Figure 1:
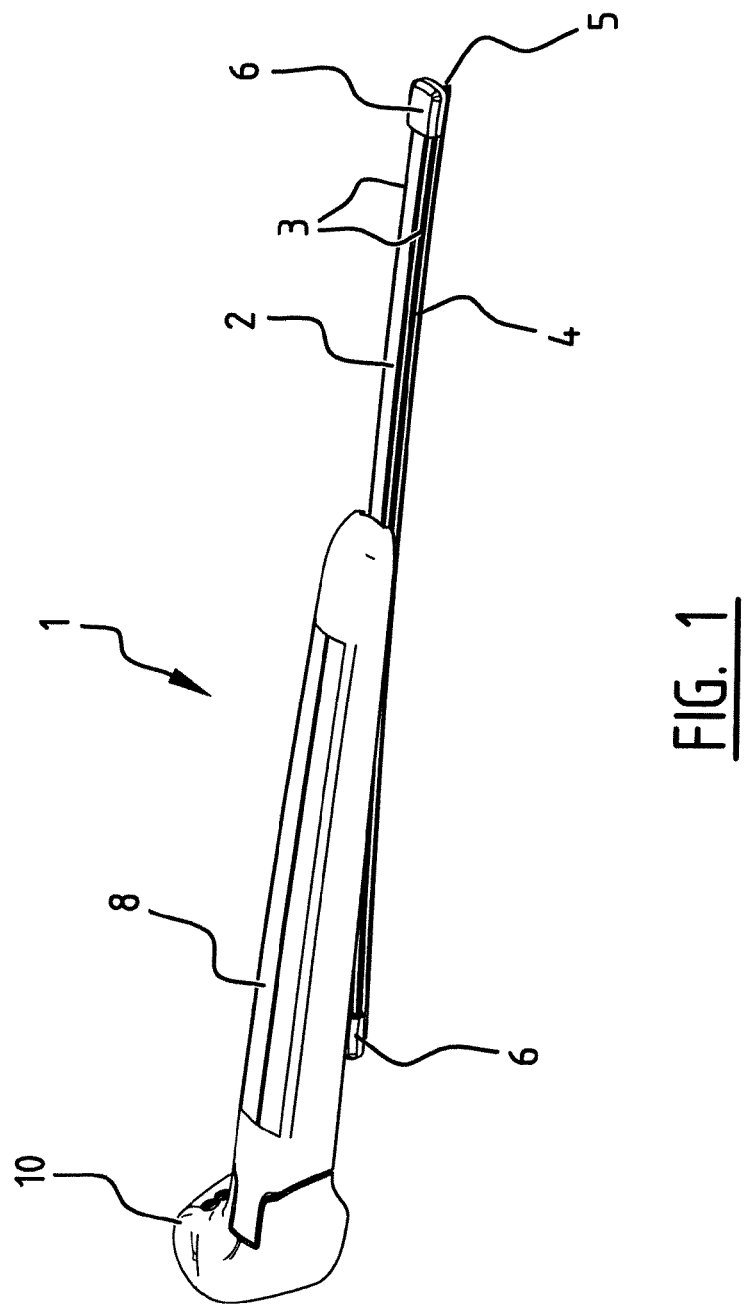
FIG. 1 is a total perspective, schematic view of a windscreen wiper device according to the prior art.
Figure 2A:
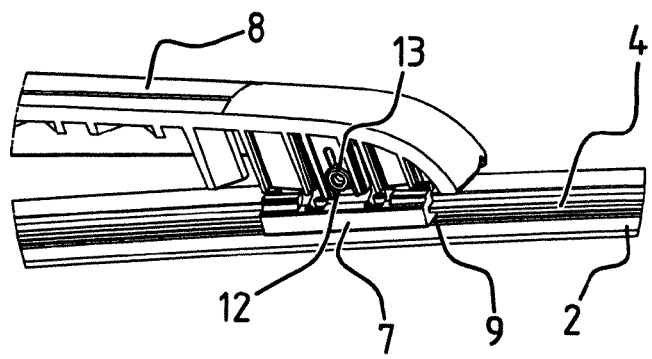
FIG. 2A-2D shows cross-sectional views of a wiper blade and an oscillating arm (partly shown) used in a windscreen wiper device of FIG. 1, wherein it is shown that both a correct and adverse interconnection of the wiper blade and the oscillating arm is possible in the prior art.
Figure 2B:
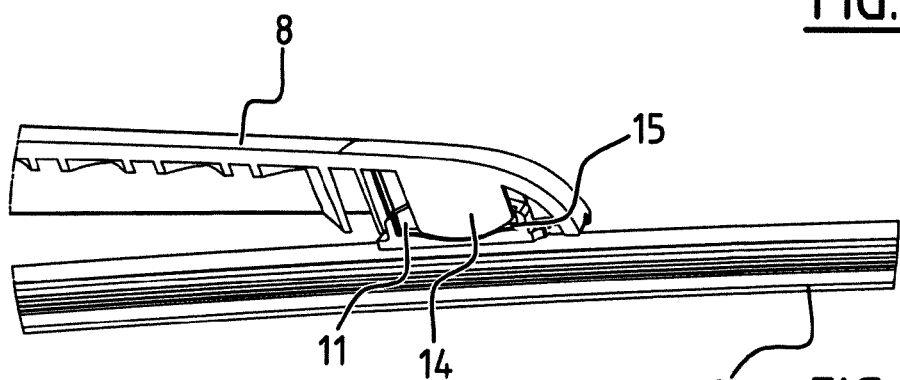
Figure 2C:
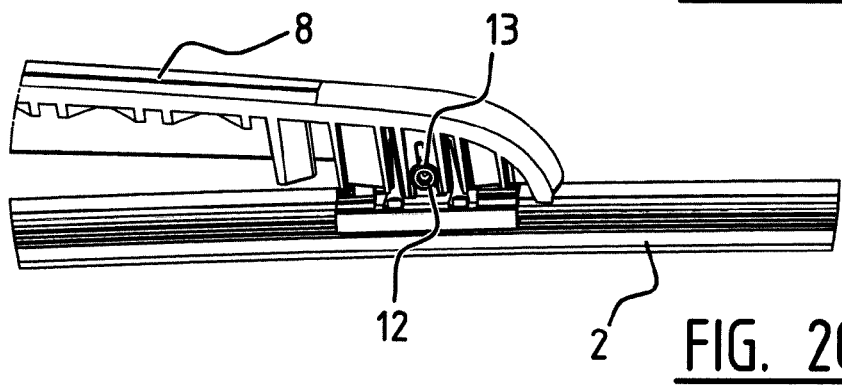
Figure 2D:
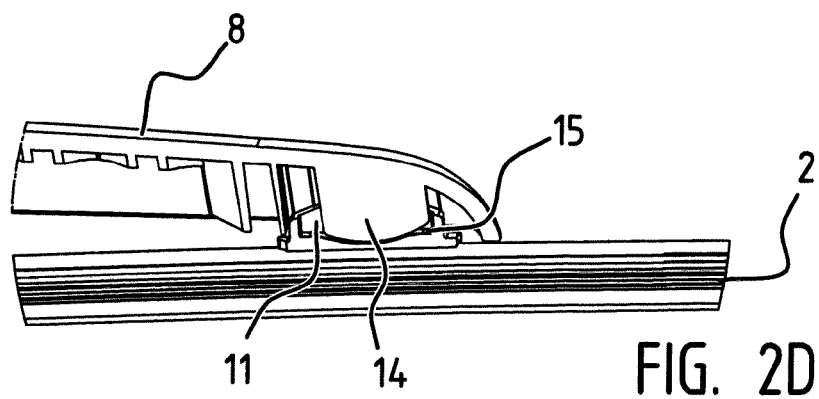
Figure 3A:
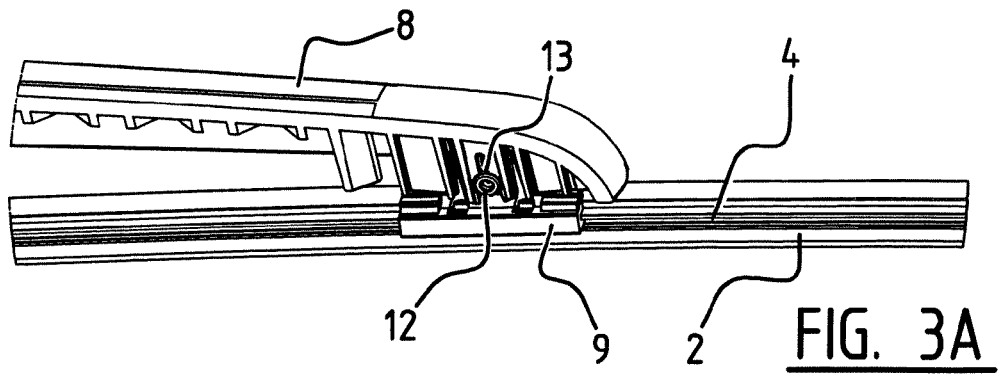
Figure 3B:
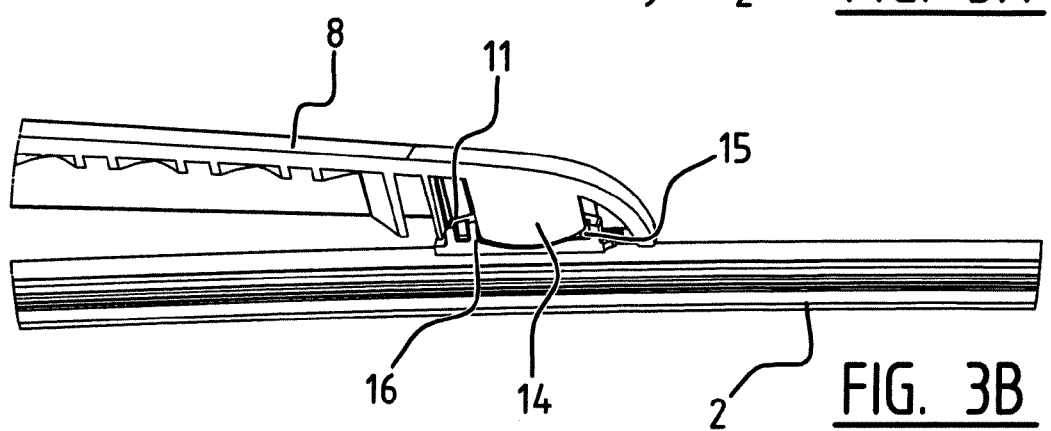
Figure 3C:
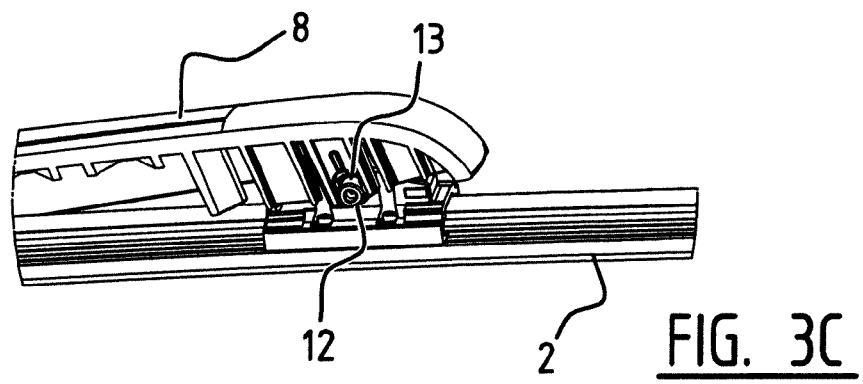
Figure 3D:
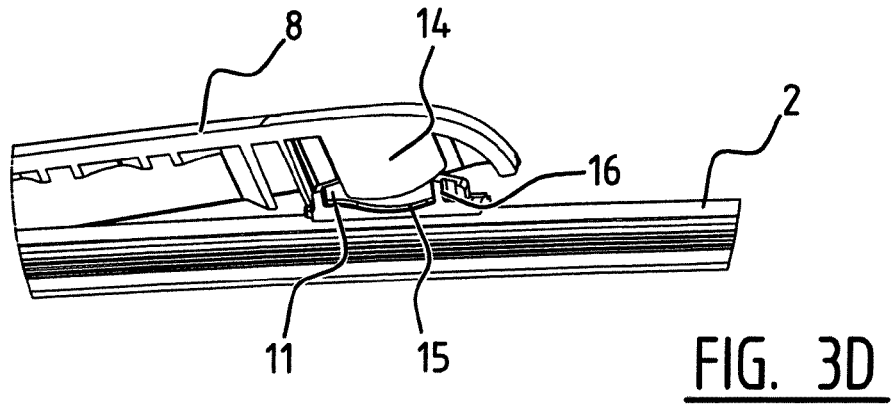
Figure 4A:
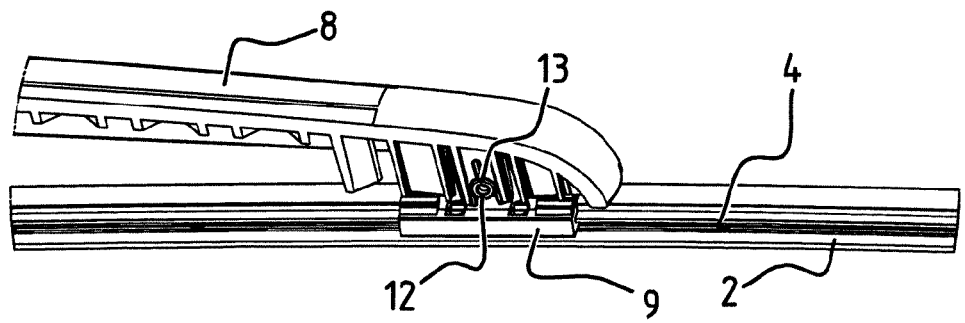
Figure 4B:
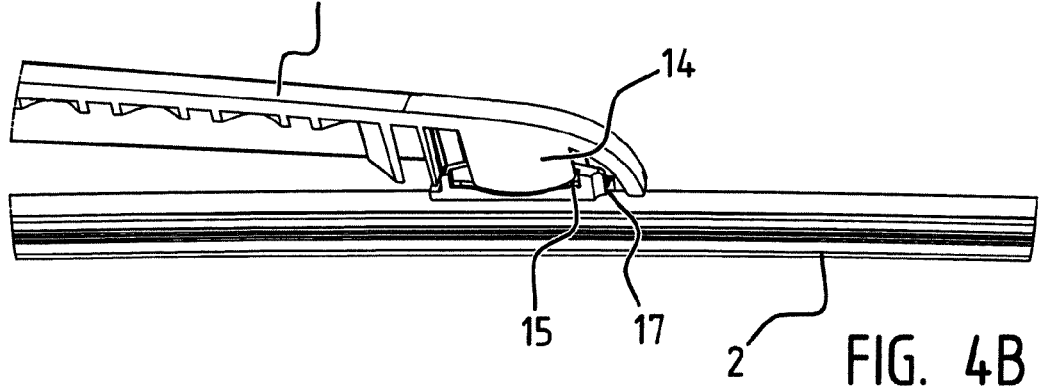
Figure 4C:
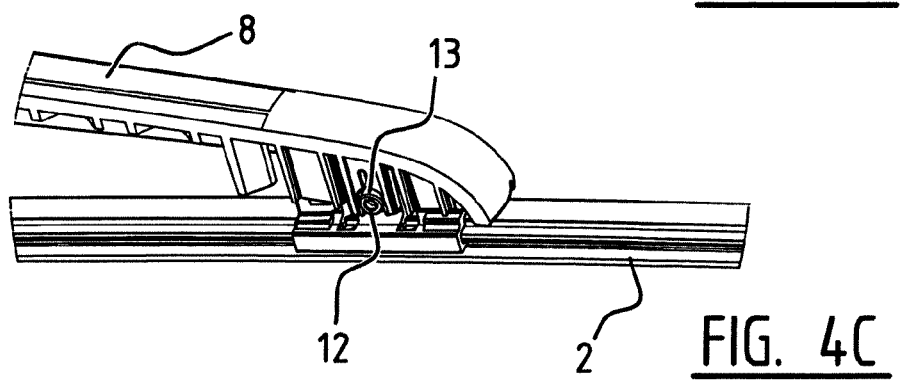
Figure 4D:
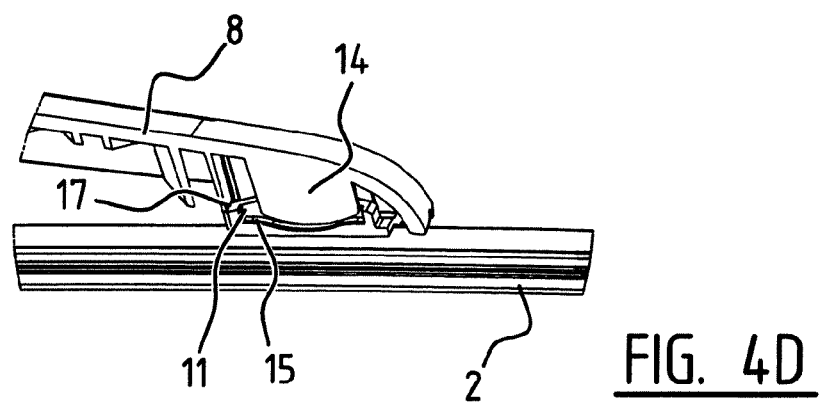
Figure 5:
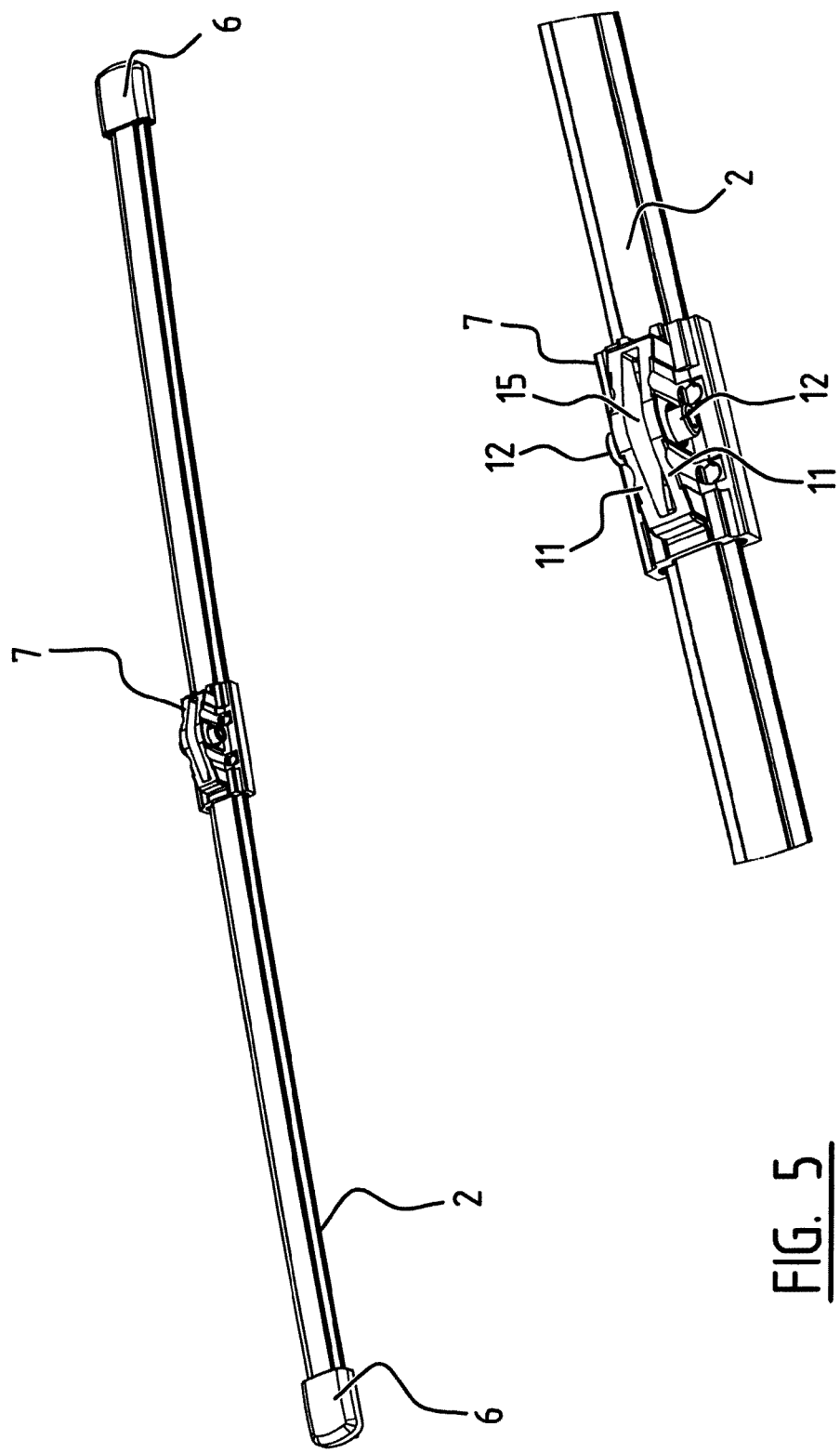
Figure 6:
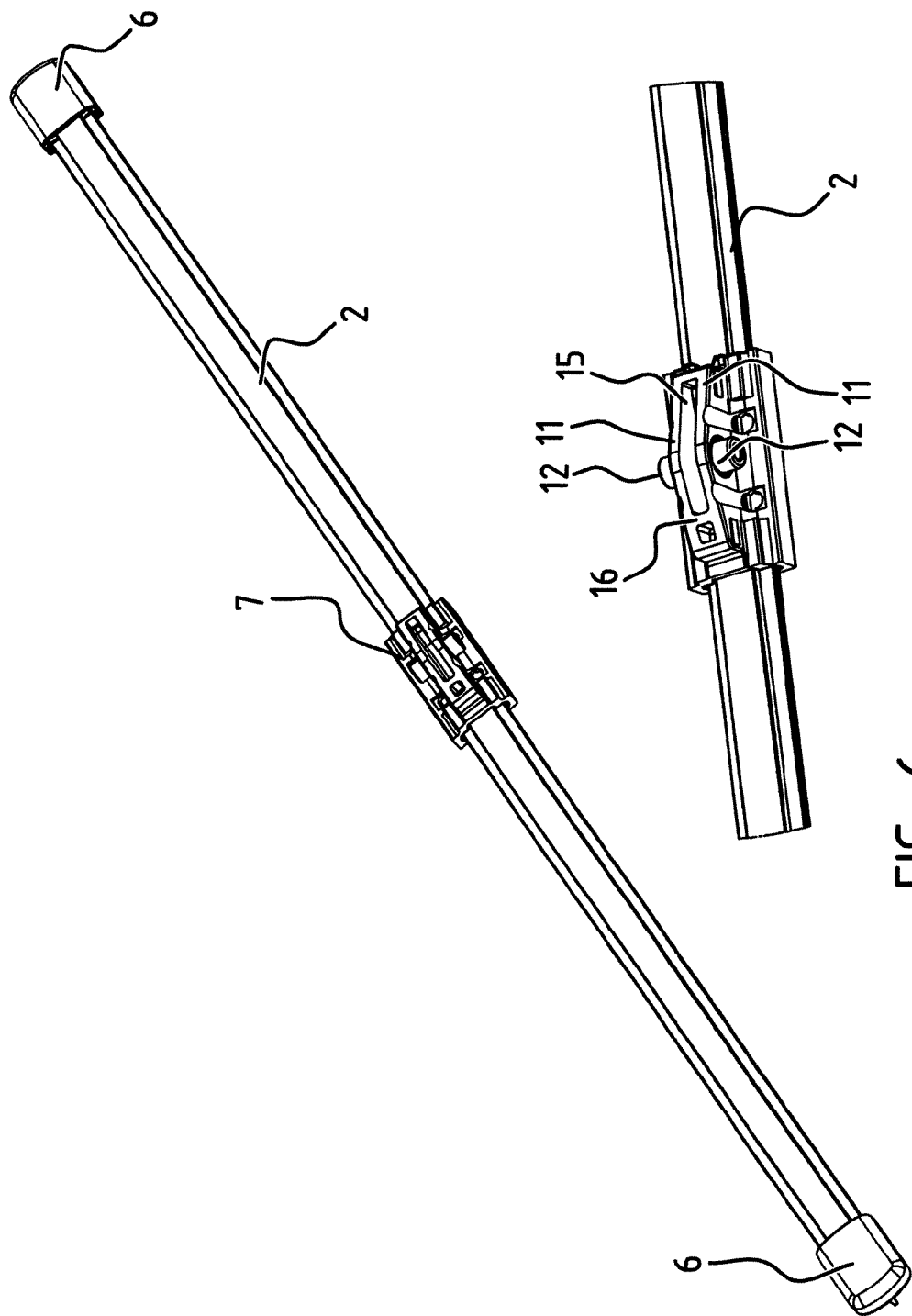
Figure 7:
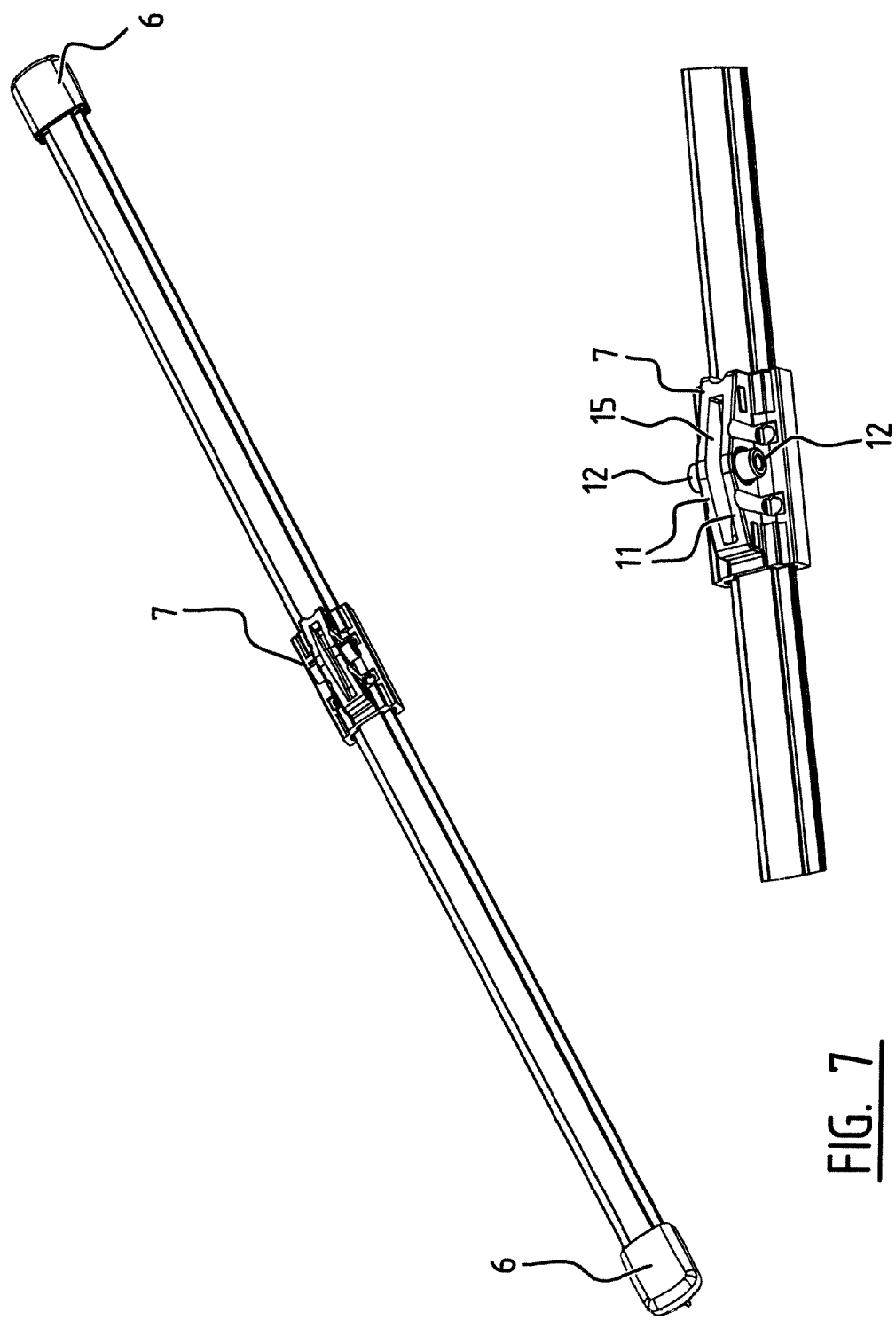
Figure 8:
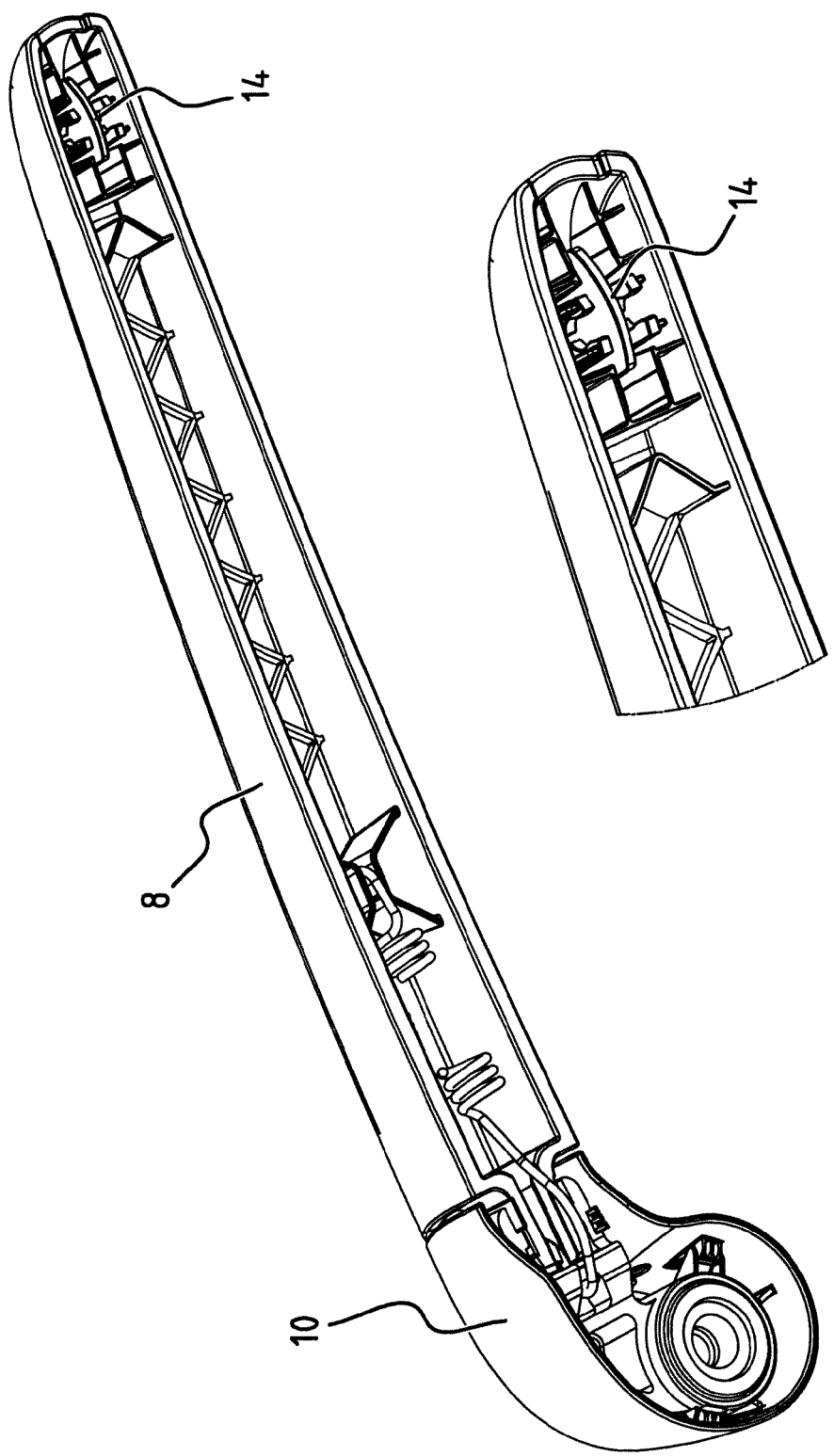

FIG. 3A-3D corresponds to FIG. 2A-2D, but now referring to a connecting device in a first preferred embodiment of the present invention, as used in the windscreen wiper device of FIG. 1;

FIG. 4A-4D corresponds to FIG. 2A-2D, but now referring to a connecting device in a second preferred embodiment of the present invention, as used in the windscreen wiper device of FIG. 1;

FIG. 5 is a perspective, schematic view of a wiper blade with a connecting device according to the prior art;

FIGS. 6 and 7 correspond to FIG. 5, but referring to a connecting device in the first and second preferred embodiment, respectively; and FIG. 8 is a perspective, schematic view of the oscillating arm of FIGS. 1 through 4, seen from below.

DETAILED DESCRIPTION

FIGS. 1 and 2 show a windscreen wiper device 1 according to the prior art the windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3, the strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6 or end caps functioning as clamping members. In this embodiment, the connecting pieces 6 are separate constructional elements, which may be form-locked as well as force-locked to the ends 5 of strips 4.

The windscreen wiper device 1 is further more built up of a connecting device 7 of plastic or metallic material for an oscillating wiper arm 8. Connecting device 7 comprises clamping members 9 that are integral therewith, which engage round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end. Further, the oscillating arm 8 is connected to a mounting head fixed 10 for rotation to a shaft driven by a small motor (not shown), In use, the shaft rotates alternately in a clockwise and in a counter-clockwise sense carrying the mounting head 10 into rotation also, which in turn draws the oscillating arm 8 into rotation and by means of the connecting device 7 moves the wiper blade 2.

As can be seen in FIG. 2, the connecting device 7 comprises two opposing sidewalls 11 each having a cylindrical protrusion 12 extending outwards on either side of the connecting device 7. These protrusions 12 pivotally engage in identically shaped cylindrical recesses 13 of the oscillating arm 8, the protrusions 12 act as bearing surfaces at the location of the pivot axis in order to pivot the oscillating arm 8 about the pivot axis near one end thereof. As shown, the oscillating arm 8 comprises a downwardly extending guiding tongue 14 engaging into a guiding groove 15 of the connecting device 7 defined between the sidewalls 11 thereof. Parts of the connecting device 7 according to the prior art acting in articulation are symmetric with respect to its middle transverse plane, seen in vertical direction. Accordingly, the wiper blade 2 with the connecting device 7 attached thereto may be mounted on the oscillating arm 8 in both correct position (FIGS. 2a en 2b) and reverse position (FIGS. 2c and 2d), as far as a cover is concerned covering the wiper blade 2 over a portion of the length of the wiper blade 2 where the oscillating arm 8 is not present.

In FIGS. 3 and 4 parts of the windscreen wiper device 1 according to the invention that correspond to those depicted in FIG. 2 according to the prior art are designated with the same reference numerals. FIGS. 3a, 3b, as well as FIGS. 4a, 4b refer to correctly mounting the wiper blade 2 onto the oscillating arm 8, while FIGS. 3c, 3d and FIGS. 4c, 4d relating to the forbidden reverse mounting thereof.

As can be seen in FIG. 3, a transverse rib 16 inside the guiding groove 15 prevents the reverse mounting of the wiper blade 2. In other words, in that case the transverse rib 16 blocks the guiding tongue 14 to slide inside the guiding groove 15, so that the protrusions 12 are not allowed to pivotally engage into the recesses 13 of the oscillating arm 8 through a snapping operation. This is due to the asymmetric form of the connecting device 7 with respect to its middle transverse plane, seen in vertical direction.

In FIG. 4 an extension 17 ensures blocking of the guiding tongue 14 to slide inside the guiding groove 15 in an attempt to adversely mount the wiper blade 2, so that the protrusions 12 are not allowed to pivotally engage into the recesses 13 of the oscillating arm through a clipping operation. In other words, at that occasion the extension 17 functions as a stop surface for the oscillating arm 8. As shown, the extension is a thicker endwall of the connecting device 7 facing away from the mounting head 10.

FIG. 5 is a perspective view of a wiper blade 2 with a symmetric connecting device 7 according to the prior art, wherein parts corresponding with parts of previous figures are designated with the same reference numerals.

FIGS. 6 and 7 correspond to FIG. 5, but clearly showing the transverse rib 17 and the extension 17, respectively, ensuring that the wiper blade 2 and the connecting device 7 attached thereto cannot be mounted to the oscillating arm 8 in FIG. 8 in a reverse manner.

FIG. 8 shows the oscillating arm 8 of FIGS. 1 through 4 in perspective, seen from below, clearly showing the guiding tongue 14 to be inserted in the guiding groove 5 of the connecting device 7 of FIGS. 5, 6 and 7.

The invention is not restricted to the variants shown, but extends also to other preferred embodiments falling within the scope of the appended claims. A skilled person, for example, would appreciate that also other measures are available to give the connecting device 7 an asymmetric shape.

The invention claimed is:

1. A windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which wiper blade comprises a connecting device for an oscillating arm, wherein said oscillating arm near one end thereof is pivotally connected to said wiper blade and near the other end thereof is connected to a mounting head on a drive shaft for transferring a reciprocal movement to said wiper blade, said connecting device comprises at least two opposing spaced-apart sidewalls each comprising a protrusion extending sidewardly and outwardly, wherein said connecting device and said oscillating arm are interconnected by said protrusions pivotally and snappingly engaging into correspondingly shaped recesses of said oscillating arm, wherein said oscillating arm comprises a downwardly extending guiding tongue engaging into a guiding groove of said connecting device defined between said sidewalls thereof and defined by a bottom, and wherein said guiding groove has an asymmetric form with respect to a middle transverse plane of said connecting device, seen in a vertical direction, and wherein a transverse rib is provided in said guiding groove and extending upwardly from said bottom of said guiding groove in order to ensure that said wiper blade can only be mounted on said oscillating arm in a predetermined orientation of said wiper blade relative to said oscillating arm.

2. The windscreen wiper device according to claim 1, wherein said transverse rib is located on a side of said connecting device facing towards said mounting head.

3. The windscreen wiper device according to claim 1, wherein said connecting device comprises an extension at a side of said connecting device facing away from said mounting head arranged for obtaining said asymmetric form of said connecting device.

4. The windscreen wiper device according to claim 1, wherein said connecting device is located inside said oscillating arm at the location of their interconnection.

5. The windscreen wiper device according to claim 1, wherein said oscillating arm has a U-shaped cross-section, and wherein said guiding tongue extends downwardly from a base of said U-shaped cross-section.

* * * * *